United States Patent [19]

Hansen

[11] Patent Number: 4,509,464
[45] Date of Patent: Apr. 9, 1985

[54] HIGH EFFICIENCY INTERNAL COMBUSTION STEAM ENGINE

[76] Inventor: Herbert N. W. Hansen, 432 Wing Park Blvd., Elgin, Ill. 60120

[21] Appl. No.: 589,049

[22] Filed: Mar. 14, 1984

Related U.S. Application Data

[63] Continuation-in-part of Ser. No. 402,116, Jul. 26, 1982, abandoned.

[51] Int. Cl.³ .................... F02M 25/02; F02M 31/10
[52] U.S. Cl. ................... 123/1 A; 123/25 B; 123/555; 123/556; 123/557
[58] Field of Search ............ 123/1 A, 3, 25 B, 25 C, 123/25 D, 25 P, 198 A, 555, 556, 557

[56] References Cited

U.S. PATENT DOCUMENTS

| | | | |
|---|---|---|---|
| 1,900,453 | 3/1933 | Luplow | 133/25 B |
| 2,686,502 | 8/1954 | Tesch | 123/25 |
| 3,968,775 | 7/1976 | Harpman | 123/25 |
| 3,980,055 | 9/1976 | Webb | 123/25 |
| 3,986,350 | 10/1976 | Schmidt | 60/274 |
| 3,989,019 | 11/1976 | Brandt et al. | 123/122 |
| 4,003,969 | 1/1977 | Robinson | 261/145 |
| 4,005,683 | 2/1977 | Whitt | 123/25 |
| 4,024,848 | 5/1977 | Lee | 123/136 |
| 4,030,453 | 6/1977 | Sugimoto | 123/3 |
| 4,031,864 | 6/1977 | Crothers | 123/1 |
| 4,098,231 | 7/1978 | Davis et al. | 123/25 |
| 4,112,889 | 9/1978 | Harpman | 123/25 |
| 4,180,036 | 12/1979 | Wolf | 123/122 |
| 4,201,167 | 5/1980 | Bayley | 123/122 |
| 4,210,103 | 7/1980 | Dimitroff et al. | 123/1 |
| 4,333,422 | 6/1982 | Mahoney | 123/3 |
| 4,368,711 | 1/1983 | Allen | 123/25 B |

*Primary Examiner*—Ira S. Lazarus
*Attorney, Agent, or Firm*—McDougall, Hersh & Scott

[57] ABSTRACT

An internal combustion steam engine is operated with an alcohol-water fuel mixture vaporized prior to combustion by heated engine coolant that flows through a first heat exchanger. The first heat exchanger or vapor generator uses the waste heat from the engine coolant to heat and vaporize the alcohol-water mixture. A second heat exchanger using exhaust gases heats the combustion air before passage through the intake manifold. Complete vaporization of the alcohol fuel is accomplished to overcome the lower caloric power potential of alcohol as compared to gasoline and to insure complete and regular combustion.

14 Claims, 8 Drawing Figures

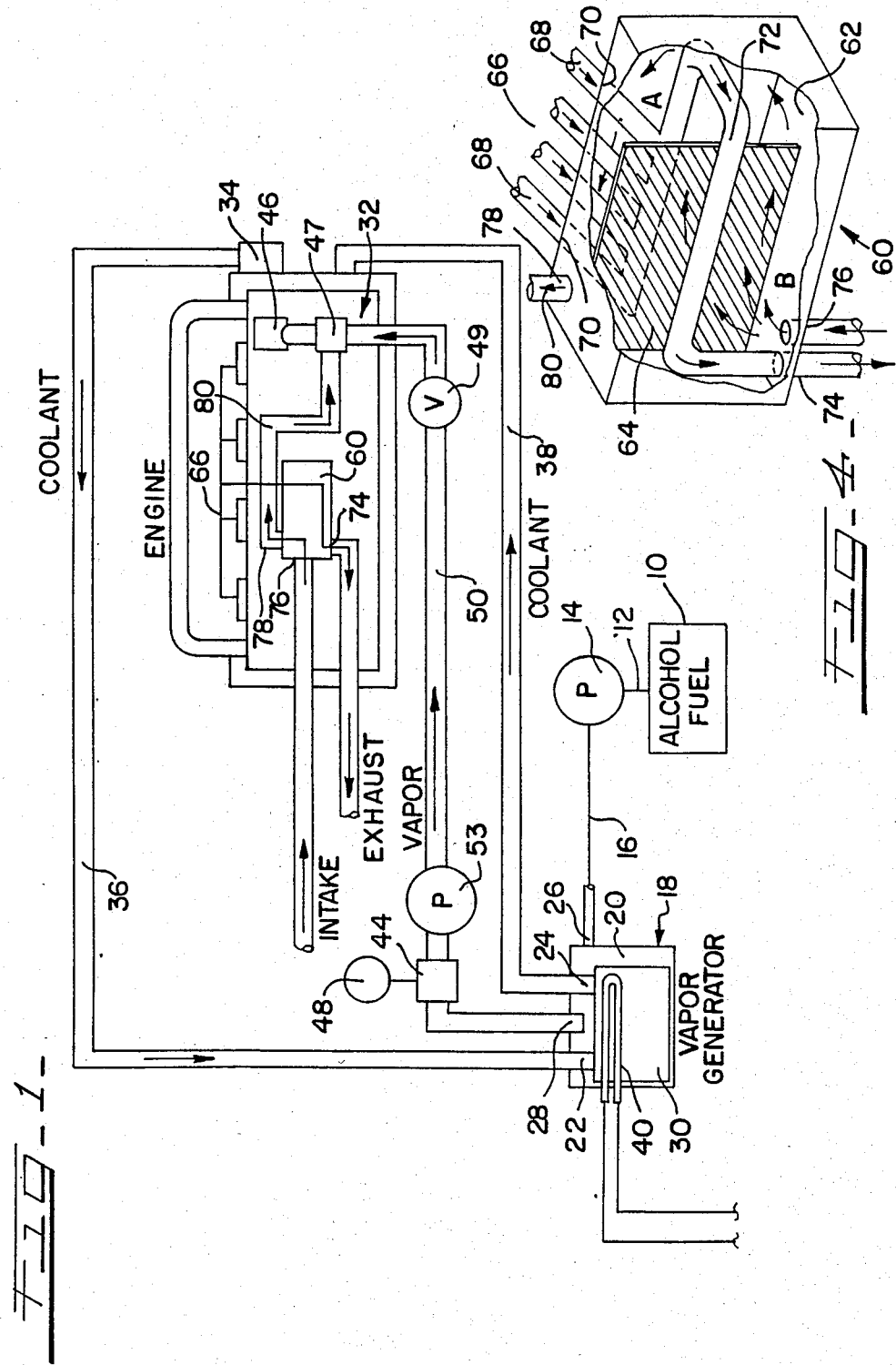

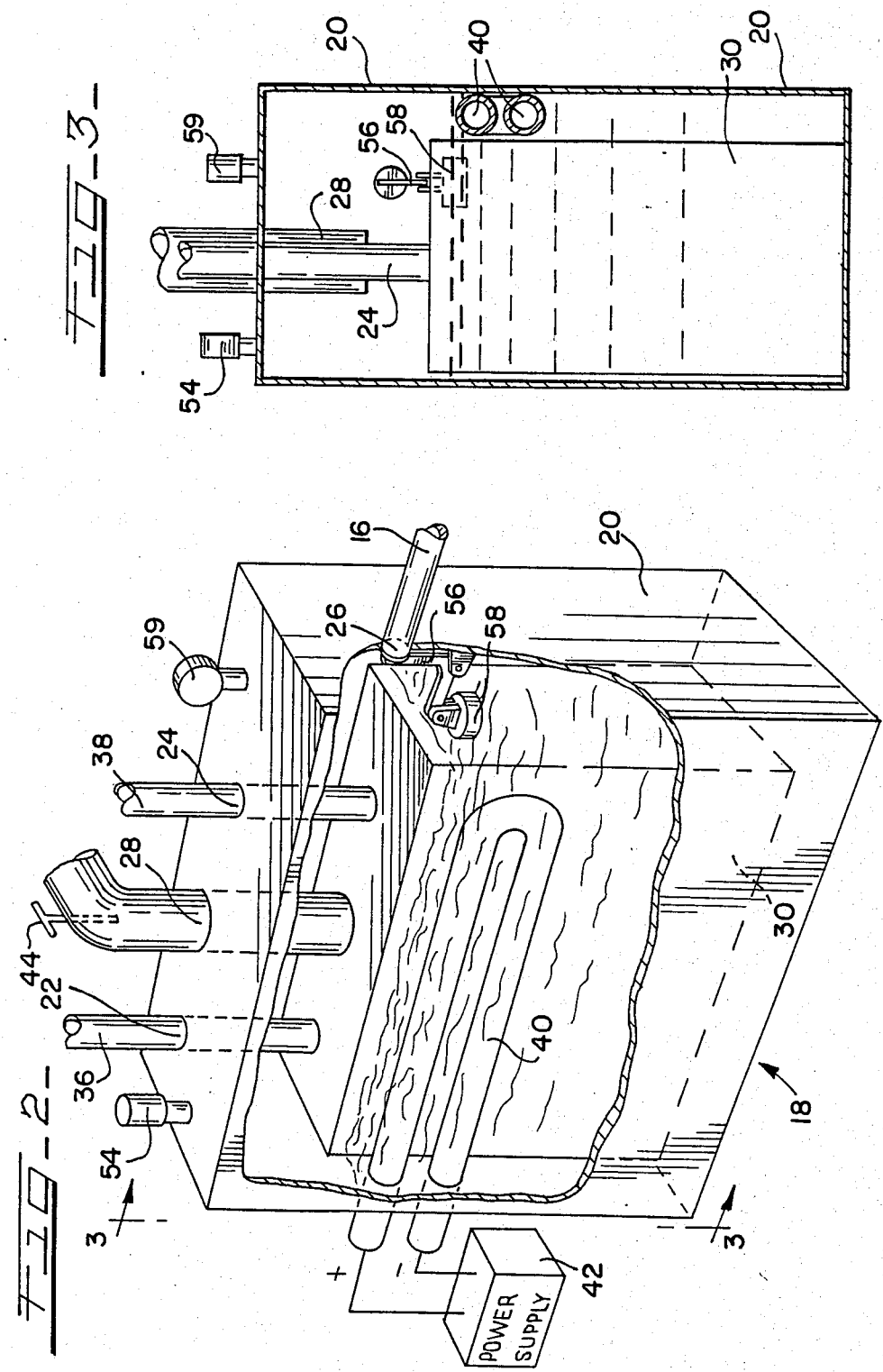

HIGH EFFICIENCY INTERNAL COMBUSTION STEAM ENGINE

This application is a continuation-in-part, of application Ser. No. 402,116, filed July 26, 1982, now abandoned.

BACKGROUND OF THE INVENTION

The present invention relates generally to an internal combustion steam engine that operates with an alcohol fuel and, in particular, to an alcohol-water fuel system for supplying a vaporizing fuel to the engine. Upon combustion, superheated steam is generated within the cylinders to produce an elevated pressure and temperature. More specifically, the present invention pertains to a unique combination of internal combustion and external burner steam technologies particularly adapted for the recirculation of heat energy to produce a highly efficient engine adapted for automotive and other uses.

Conventional gasoline engines operate on what is known as the OTTO cycle wherein a carbureted mixture of fuel and air is ignited following compression in the well known manner and, thereafter, expelled to the surroundings through an exhaust manifold and muffler system. Such engines, however, exhibit substantial losses of heat and other energy which, in turn, results in poor fuel to mechanical work energy conversion. First, the burning gases produce a mean effective pressure in the cylinder of about 100–200 psi but at an extremely elevated temperature of typically 3000° F. This excessive heat, which is generally dissipated through an engine radiator to avoid cylinder and piston destruction, accounts for an approximate 35 percent loss in the BTU energy of unburned gasoline fuel.

Further, it is known that proper stoichiometric mixtures for complete fuel burning do not ignite readily and, therefore, excessive fuel (i.e. rich mixture) is generally provided. This, in turn, results in partial or unburned carbon exhaust products contributing to environmental pollution and further losses in efficiency. As an alternative, conventional fuel injection systems may be employed to directly inject fuel droplets into the airstream. Although more efficient than conventional carburetors, the injection of relatively large droplets, typically 0.050 inches in diameter, still results in incomplete combustion.

In addition to the above described unburned fuel and coolant energy losses, the exhaust gases are quite hot, often in excess of 1500° F., thereby adding further to the heat energy loss. Indeed, it is common to see exhaust manifolds heated to glowing, and flames emitted from the exhaust pipe are not uncommon. In total, these exhaust related losses account for another 35 percent of the total gasoline fuel energy. Deducting yet another 10 percent for frictional losses, the overall efficiency of a typical internal combustion gasoline engine is in the order of about 20 percent.

In sharp contrast to the elevated operating temperatures of gasoline fueled internal combustion engines, a typical external combustion steam engine operates at temperatures between about 440° F. and 470° F. corresponding to steam pressures between about 400 psi and 500 psi. Thus, a conventional external combustion steam engine produces the requisite cylinder pressure but at a greatly reduced operating temperature which, in turn, significantly lessens engine cooling and exhaust heat losses.

Conventional external combustion steam engines, however, have several dissadvantages which render them unsuitable for use in modern automobiles. First, a relatively bulky boiler is required to generate the steam. In addition, significant time is required to heat the boiler to operating pressures which delays productive use of the engine upon initial start-up and, during low load periods, renders the system relatively more inefficient.

Conventional external combustion steam engines are, in any event, rather inefficient. These engines, which operate on the RANKINE cycle, require the burning of fuel to heat and vaporize water contained within a boiler. The resulting steam passes through necessary piping and controls and, in turn, is admitted to engine cylinder. Assuming that the boiler water is initially at 32° F., 180 BTU per pound must be added to raise the water to the 212° F. boiling point and an additional 1030 BTU to convert the water to the steam phase at 500 psi. Assuming, further, that a typical steam engine exhausts the steam at as little as 20 psi, an overall engine efficiency of 4 percent results. Even this low efficiency figure is optimistic as other losses including boiler efficiency were not considered.

The present internal combustion steam engine, by contrast, represents a highly efficient combination of steam and internal combustion technologies particularly suited to the reclamation of otherwise lost heat energies. First, the energy in the engine cooling system is recycled to vaporize the water-alcohol fuel mixture. This vaporized fuel burns more rapidly thereby producing the maximum pressure in the cylinder and the highest mean effective pressure. The water enters the cylinder as a vapor with an enthalpy already at 1150 BTU per pound requiring only an additional 50 BTU to raise its pressure, as in the steam engine example above, to 500 psi. Assuming, again, an exhaust pressure of 20 psi and substantially complete recirculation of the coolant energy (actually, a few percent recirculation loss is typical), a thermal efficiency of about 88 percent results.

Further, since substantially all the fuel of the present invention is burned, there is correspondingly little lost fuel energy and minimal environmental pollution. To further improve the efficiency of the present engine, the exhaust gases may advantageously be recirculated to preheat the carburetor inlet air to approximately 500° F. thereby further reducing the heat which must be subsequently added or generated in the steam combustion cylinder cycle. In this manner, the exhaust losses are reduced to about 15 percent. Considering frictional losses, an overall efficiency of slightly more than 50 percent may be achieved. This is about three times the efficiency of a conventional gasoline internal combustion engine, about twice that of a diesel, and over ten times as efficient as a steam engine.

A further advantage of the present engine is that it may be operated with many differing fuels including most alcohols. This includes a variety of hydroxyl derivatives of hydrocarbons such as methanol, ethanol, isopropanol, tertiary butanol and mixtures thereof with water. The preferred fuel is ethanol which can advantageously be made inexpensively from organic waste. In addition, ethanol will support combustion when mixed with water even at low concentrations. This heat of combustion turns the water into, or superheats, the steam.

Internal combustion engines operated with alcohol or a blended gasoline-alcohol mixture are well known. Such blending, however, lowers the boiling point of the gasoline and thereby causes vapor lock in the fuel pump at a lower temperature than would be the case with pure gasoline. In addition, the introduction of water to a blended gasoline-alcohol fuel mixture causes the mixture to separate into its constituent phases. Since the resultant fuel supplied to the carburetor is not of constant composition and does not correspond to the composition to which the carburetor was initially adjusted, the engine malfunctions.

SUMMARY OF THE INVENTION

According to the present invention, an alcohol-water fuel is pumped from a fuel reservoir into a first heat exchanger or vapor generator where the waste heat from the engine cooling system vaporizes the fuel. The fuel then passes through suitable valves, controls and a vapor carburetor before entering the engine cylinders. The alcohol burns in the cylinders turning the water vapor into superheated steam. A high alcohol content results in high pressure and temperature. The reverse is also true. Alcohol of 125 to 140 proof gives engine performance superior to gasoline fuel with lower proofages, down to about 90 proof, performing quite substantially. A higher proof alcohol is needed in cold weather when the passenger compartment of the vehicle must be heated, because engine heat losses are greater in cold weather.

In one embodiment of the present invention, an electrical means is provided in a first heat exchanger to heat and vaporize the alcohol fuel prior to ignition and thus avoid the cold starting problems associated with the use of alcohol as fuel. According to a second embodiment, warmed engine coolant is circulated through the first exchanger similarly vaporizing the alcohol fuel. The unique two-stage heat exchanger, having an upper first stage hot plate, is particularly suited to the vaporization of low proofage fuels while minimizing fractional distillation. In addition, means are provided to heat the combustion air in a second heat exchanger priot to combustion using thermal energy of the hot exhaust gases generated by the engine under normal operating conditions.

According to the present invention, the alcohol-water mixture is conveyed to the first heat exchanger, and heat is transferred from the electric heating element or the heated engine coolant to the water-alcohol. In the first heat exchanger the alcohol-water fuel is vaporized. The alcohol and water vapors produced are then passed to the intake manifold of the engine. All components of the fuel system through which the heated fuel and the vapors flow are insulated to minimize heat loss.

A second heat exchanger located on the exhaust lines heats the combustion air which also flows to the intake manifold. As a result, the temperature of the air passing to the intake manifold is increased, and the vapors generated in the first heat exchanger are maintained in a gaseous state prior to combustion.

It is an object of this invention to increase the efficiency of an alcohol operated internal combustion engine by providing means for vaporizing an alcohol-water fuel and means for heating and humidifying the air used in combustion.

It is a further object of this invention to provide a means for overcoming the cold starting problem of an internal combustion engine operated with alcohol as fuel.

Other objects and advantages will be apparent from the following detailed description made with reference to the accompanying drawings.

BRIEF DESCRIPTION OF THE DRAWINGS

FIG. 1 is a schematic representation of a preferred embodiment of the invention;

FIG. 2 is a cutaway perspective view of a first heat exchanger or vapor generator which heats and vaporizes the alcohol water mixture with hot engine coolant;

FIG. 3 is a sectional view taken along line 3—3 of FIG. 2; and

FIG. 4 is a cutaway perspective view of the second heat exchanger which heats the combustion air with exhaust gases.

DETAILED DESCRIPTION OF THE INVENTION

Figure 5:
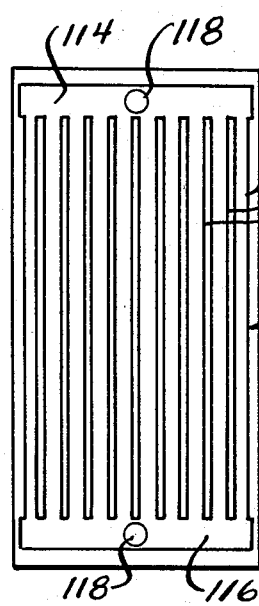
FIG. 5 is a sectional view of an alternative embodiment of the present vapor generator taken substantially along line 5—5 of FIG. 7 depicting the vaporizer hot plate.

Referring to FIG. 1, the fuel is stored in a reservoir 10 and is withdrawn therefrom through a conduit 12 under pressure produced by a fuel pump 14. As previously described, the fuel is an alcohol-water mixture, the preferred alcohol being ethanol.

The fuel flows through a conduit 16 to a vapor generator 18, which is essentially a heat exchanger, at a pressure of approximately two pounds per square inch. The vapor generator 18, more clearly shown in FIGS. 2 and 3, is a hollow container or cylinder 20 having a liquid coolant inlet 22 and outlet 24 in addition to a fuel inlet 26 and outlet 28.

Positioned within the container 20 is a heater core 30 through which engine coolant can circulate. Specifically, liquid coolant from the internal combustion engine 32 is circulated by a water pump 34 through a hose 36 to the coolant inlet 22. The coolant then circulates through the heater core 30 and, after passing through the coolant outlet 24, returns to the engine 32 through a hose 38.

An elongated, rod-like electric heating element 40 is located within the continer 20, the heating element 40 being immersed within the fuel which surrounds the heater core 30. The electric heating element 40, which is operated by a power supply 42 (for example, the vehicle's battery), supplements the heat from the engine coolant to overcome the cold starting difficulties associated with the use of alcohol fuel. A thermostat 44 positioned between the vapor generator 18 and the vapor carburetor 47 of the engine controls the heating element 40 and a ready light 48, which indicates that the circuit is operating. The alcohol and water vapors flow through the fuel outlet 28 to a conduit 50 in communication with a demand valve 49 connected to the vapor carburetor 47. The carburetor 47, in turn, is connected to the intake manifold 46 of the engine.

A pressure relief valve 54 which is set, for example, at four pounds pressure can be used as a safety device to prevent the buildup of excess pressure within the container 20. The liquid fuel level in the container 20 is regulated by a valve 56 and a float 58 associated with the fuel inlet 26.

In operation, the fuel pump 14 fills the vapor generator 18 with fuel to a level about one inch below the top of the heater core 30. This serves the purpose superheating the vapor and channeling all the liquid to be vaporized by the submerged heating element 40. With alcohol proofage at 140 or below there is a tendency for fractional distillation to occur when the engine coolant is being heated to the operating temperature. As the temperature passes 175° F., the alcohol would be distilled leaving the water behind. This can create an imbalance in the air-fuel ratio. Later as the engine reaches operating temperature, the remaining water would be vaporized. Thus, the vapor would first be too rich and then too lean. The heating element 40 and the channeling of the liquid along the sides of the heater core 30 solves this problem.

A pressure relief valve such as valve 54, is required by law on all pressure vessels. It can be connected to a hose (not shown) to vent back to the fuel reservoir so no fuel is lost and most of the heat is recovered. Normally the valve will not be used. If the valve should start venting, it indicates too high a proofage of fuel is used. Lower proofage produces a lower operating temperature.

The heating element 40 activated by a pressure switch 59 is on when the pressure within the container 20 is less than three pounds per square inch. Thus, the heating element operates when starting from a cold start. In severely cold weather, when heat is needed for the car and heat loss is substantial, the heating element will operate continuously.

In practice, the heat of combustion produced as the ethanol water fuel is burned raises the temperature and pressure of the vapor from 212° F. and 14.7 psi to superheated steam at 500 psi and 600° F. by only adding 148 btu per pound of vapor. If the typical boiler arrangement is used, 1270 btu would be required. The expanding steam moves the piston to produce useful work. In a preferred embodiment exhaust gas temperature and pressure are 280° F. and 50 psi, respectively, with a heat content or enthalpy of 1174 btu.

The flash point of ethanol is 70° F. This means that ethanol will not ignite at a temperature less than 70° F. This is a safety feature in the event of an accident. The flash points, however, also present a problem in ignition because most of the time the ambient temperature of the fuel mixture is below the flash point. By vaporizing the fuel, the ignition problem is solved except for the fact that if the engine is cold, the vapor will cool and condense below the flash point.

As a solution to that problem, propane can be used as a starting fuel. A small tank (not shown) with a pressure reducing valve and a vaporizing valve furnishes propane vapor to the vapor generator at one pound pressure. As long as the alcohol-water vapor pressure is less than one pound, the propane is admitted. When the pressure rises above that, the propane will no longer flow. By this time, however, the engine is at operating temperature, and the carburetor air is above the minimum of 212° F.

Propane was selected as the auxiliary starting fuel because it is compatible with alcohol and water. It can be heated in the vapor generator to heat the elements of the vapor line and prevent condensation when the alcohol and water vapor start to flow. The transition from one fuel to the other is gradual and does not impair the performance of the engine. The different air-fuel ration of combustion is automatically changed by a pressure control switch which energizes a solenoid valve.

As further shown in FIG. 1 and illustrated in greater detail in FIG. 4, a second heat exchanger 60 comprises a chamber 62 divided into at least two adjacent compartments A and B by a partition 64, which extends from the top to the bottom of the chamber and from one side substantially to the other side of the chamber.

The exhaust manifold 66 of the engine is connected by exhaust pipe 68 to an exhaust gas inlet 70 in one of the compartments (for example, compartment A). A heat transfer tube 72, which has a large circumference relative to the exhaust pipe 68, extends within the chamber along the face of the partition 64 defining compartment A, into compartment B, and to an exhaust gas outlet 74 which is in communication with the atmosphere.

An air inlet 76 adjacent the exhaust gas outlet 74 in compartment B directs combustion air into the chamber 62 for flow through compartment B and compartment A to an air outlet 78, which is connected by a hose 80 to the vapor carburetor 47 of the engine.

During operation of the engine, hot exhaust gases flow through the heat transfer tube 72 and compartments A and B of the second heat exchanger 60 to heat the combustion air flowing in the opposite direction through the heat exchanger. Because the heat transfer tube 72 has a relatively large circumference, the surface area of the tube 72 in contact with the surrounding combustion air is increased and maximum heat transfer is achieved between the exhaust gases flowing through the tube and the combustion air. In a second embodiment of the second heat exchanger 60, a plurality of heat transfer tubes can extend between compartments A and B.

The heated combustion air passes through air outlet 78 to the hose 80 connected to the vapor carburetor 47. Thereafter, the heated air flows to the intake manifold. As the heated combustion air combines with the alcohol and water vapors produced by the first heat exchanger 18, the air becomes saturated with alcohol and water. Likewise, the heated air aids in maintaining the vaporized state of the alcohol-water fuel.

The moisture from the vaporized fuel creates steam in the engine cylinders which produces a higher internal pressure than in the case of a heated dry gas due to the steam-water volumetric expansion ratio of 1600:1. A dry gas, on the other hand, expands only in direct proportion to its absolute temperature. Thus, greater expansive forces are realized upon combustion due to the presence of steam in the engine cylinders at elevated temperatures. The addition of water in the form of steam to the system may also have the additional advantage of reducing the generation of emissions because the cooling effect of the condensed water lowers the combustion temperature thereby reducing nitrogen oxide production which is temperature-time dependent.

The volume of alcohol vapor that flow from the vapor generator 20 and the intake manifold 46 can be manually controlled by the operator. As indicated, the thermostat 44 is also adjustable. Thus, the fuel system is capable of using alcohols with different boiling points. In addition, the system can adapt to ambient temperature changes and pressure changes due to variations in altitude. A thermostat adjustable within the range of 140° and 220° F. is suitable for use in this invention.

In essence, the invention is an internal combustion steam engine because superheated steam is generated within the cylinder. The lower temperatures at the pressure involved as compared to gasoline fuel, produce a high efficiency and a substantial energy savings. The combustion characteristics of alcohol result in minimal pollution, less engine wear and a longer life for the unit.

The lower cylinder temperatures also mean much less energy is transferred into the engine cooling system. Therefore, a large radiator that dissipates energy to the atmosphere is not required. Instead, a small unit immersed in the fuel in the vaporizer is adequate. Moreover, instead of releasing this energy, it is recycled to heat the fuel. Once the engine is at the operating temperature, the same energy can be recirculated between the fuel and the cooling system.

Figure 6:
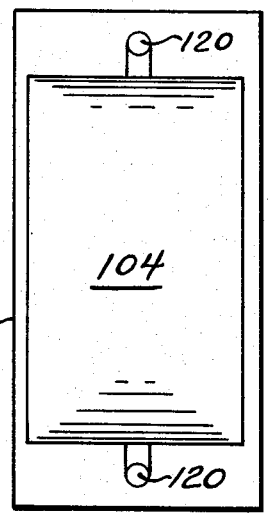
FIG. 6 is a section view of the vapor generator of FIG. 5 taken substantially along line 6—6 of FIG. 7 depicting the vaporizer heat exchanger.
Figure 7:
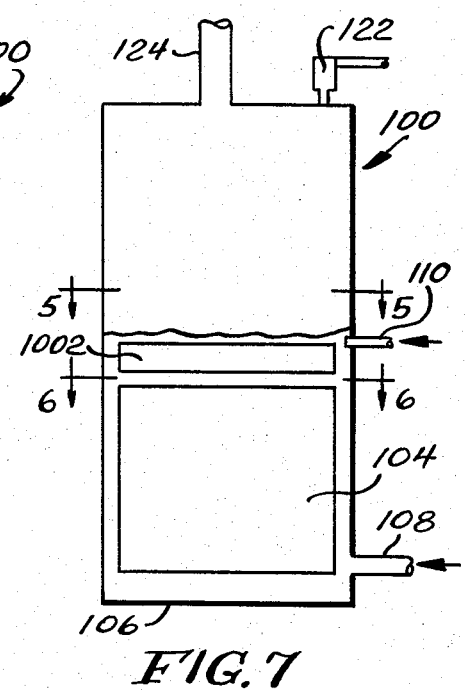
FIG. 7 is a profile view of the vapor generator of FIG. 5 with portions broken away to reveal the positioning of the hot plate and heat exchanger therein; and, FIG. 8 is functional block representation of the oxygen sensing carburetor control of the present invention.

A second embodiment of the vapor generator 18 of FIG. 1 is shown generally at 100 in FIGS. 5-7. This embodiment offers improved performance where the present engine is operated with low alcohol fuel proofages. Specifically, this alternative structure further reduces fractional distillation which becomes an increasing problem as the fuel proofage is reduced. Fractional distillation occurs due to the higher volatility and lower boiling point of alcohol as compared with water. More specifically, there exists a certain molecular affinity between the water and alcohol molecules which, at higher alcohol concentrations, limits the disassociation of these disparate molecules. However, as the alcohol concentration is lowered, the effects of molecular affinity are reduced with a corresponding tendency that alcohol, with its lower boiling point of 173° F., will be evaporated more readily.

This phenomenon, known as fractional distillation, results in a proportionately higher percentage of alcohol, than water, vaporization. Thus, fractional distillation increases the effective concentration of alcohol, initially, but ultimately results in lowered concentrations as the liquid fuel mixture that remains is comprised of an excessive proportion of water.

Vapor generator 100 includes a hot plate 102 positioned directly above a finned heat exchanger 104, both of which are submerged beneath the alcohol fuel in a vaporizer shell 106. A liquid fuel inlet 108 is provided in the lower portion of shell 106 to admit fuel substantially at ambient temperature. A liquid level controller 110 is positioned in shell 106 immediately above heat exchanger 102. Controller 110 is operatively connected to a fuel pump 14, FIG. 1, thereby to maintain the vapor generator fuel level at a predetermined level above the hot plate. As will be explained in more detail below, the fuel is preferably maintained approximately ⅛ inch above the upper hot plate surface which may be contoured or include ridges or the like to dampen oscillatory fuel movement thereover.

The hot plate is comprised of parallel heating tubes 112 interconnecting opposed manifolds 114, 116 whereby engine coolant entering manifold 114 passes through the plural tubes 112 before exiting through manifold 116. Each manifold is provided with an appropriate liquid coolant inlet (outlet) 118 for interconnection with the engine cooling system and the heat exchanger 104 as considered below. Hot plate tubes 112 are preferably about—inches in diameter with approximately 1/16 inch separating adjacent tubes.

Heat exchanger 104 may be of conventional finned design and includes inlets (outlets) 120 at the ends thereof. One of the heat exchanger inlets 120 is positioned substantially below, and is interconnected with, an outlet 118 from the hot plate. The remaining hot plate inlet 118 is connected to the coolant line from the engine, for example line 36 of FIG. 1. In similar fashion, the remaining inlet 120 of the heat exchanger is connected to the return coolnt line 38, FIG. 1. Thus, hot plate 102 and heat exchanger 104 are series-configured such that the hottest coolant directly from the engine passes through the hot plate first.

A pressure relief safety valve 122 is provided above the liquid level of the vapor generator shell. This valve is set at approximately 4 psi and vents excessive vapor pressure through a condenser (not illustrated) to the fuel tank 10. A vaporized fuel outlet 124 is interconnected through a vapor pump 53, FIG. 1, to the carburetor.

In operation, the coolant from the engine enters the hot plate generally in the range of about 250°–260° F. This extremely hot coolant passes through the relatively small mass comprising the hot plate tubes 112 which, in turn, heats the fuel immediately adjacent thereto. As the liquid fuel is maintained at a level just above the hot plate and, further, the temperature of the hot plate exceeds the boiling point both of alcohol and of water, vaporization of the both liquids occurs substantially in proportion to their respective constituent concentrations. Thus, fractional vaporization is avoided in the hot plate region.

The engine coolant, having dissipated a portion of its heat energy in vaporizing the fuel, next enters the fuel preheat exchanger 04 at a temperature of approximately 200° F. where it serves to preheat the incoming alcohol based fuel from ambient to a temperature somewhat below the boiling point of alcohol, 178° F. Temperatures in excess of this boiling point increase fractional distillation while substantially lower temperatures decrease vaporizer efficiency. The coolant is returned through a conduit 38, FIG. 1, to the engine for reheating.

It will be appreciated that the coolant of the present invention not only functions to maintain proper engine operating temperatures, but importantly, serves the dual purpose of vaporizing the alcohol fuel thereby substantially improving engine overall efficiency. It will be further noted that the alcohol steam internal combustion engine of the present invention is particularly adapted for energy reclamation for the following reasons. First, the alcohol based fuel burns at lower cylinder temperatures thereby lowering the overall cooling system loss of heat and, further, rendering heat reclamation easier due to its inherently lower temperature. In addition, the steam operation of the present engine is uniquely suited for fuel preheating or vaporization wherein the water must be vaporized in order to produce useful work output. Conventional internal combustion engines do not realize the same improvements in efficiency by vaporizing the fuel and, in any event, the handling of vaporized gasoline presents potential safety problems.

Figure 8:
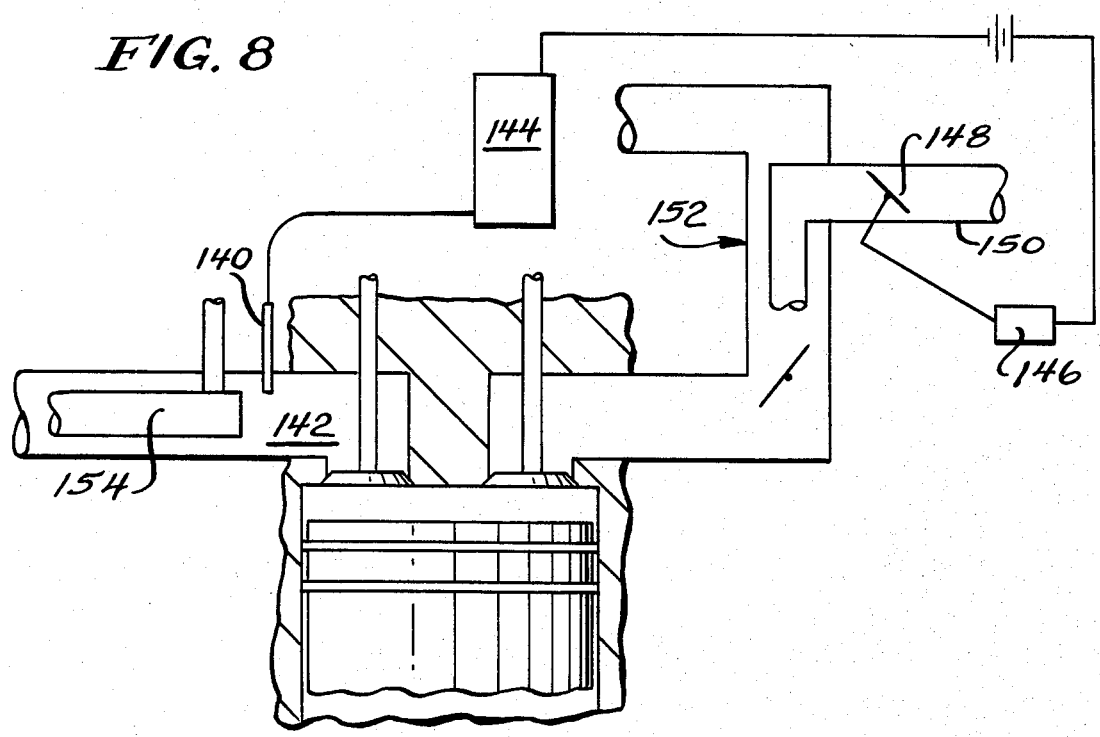

FIG. 8 illustrates the electronically controlled carburetor which is required where low, or varying, fuel proofages (grades) are contemplated. The typical vapor carburetor operates on the volumetric ratio principle which provides marginal performance in view of the range of volumetric ratios encountered. Thus, for example, the air-fuel ratio of the propane utilized for cold weather starting of the present engine is 17-to-1; ethanol is 10-to-1; while 100 proof ethanol, due to the concentration of water which does not require oxygen, is only 5-to-1. This wide variation between usable fuels prohibits the effective use of conventional mechanical carburetors.

The electronic carburetor of the present invention utilizes an oxygen sensor 140 in the exhaust manifold 142 interconnected through conventional feedback control circuitry 144 to a servo motor 146 actuated butterfly valve 148. Valve 148 is positioned in the vapor fuel inlet 150 to the carburetor 152 and is automatically manipulated to maintain a predetermined exhaust gas oxygen content. In this manner a proper combustion mixture may be maintained for any fuel and each environmental condition thereby assuring minimal pollution due to complete fuel combustion. In addition, the relatively low combustion temperatures associated with the present internal combustion steam engine precludes the generation of nitrous oxides thereby further assuring an engine of very low pollution output.

As previously indicated, it is desirable to preheat the carburetor inlet air to facilitate the generation of superheated steam in the cylinders. A carburetor air preheater 154 may be positioned in the exhaust manifold 142 as illustrated in FIG. 8 or, alternatively, the previously described preheater 60, FIG. 4, may be utilized. In either event, the temperature of the incoming carburetor air is preferably heated between 500° and 600° F. It is important that this incoming air not be heated substantially above 600° F. in order that the auto-ignition temperature of ethanol, 685° F., be safely avoided.

What is claimed:

1. A fuel-water system for an internal combustion steam engine adapted for use with alcohol-water mixtures, the engine including at least one cylinder having an air/fuel-water inlet and a burned fuel exhaust outlet, the engine further including a fluid engine coolant system; the fuel-water system comprising a carburetor; a reservoir adapted to contain an alcohol-water mixture; two-stage fuel-water vaporizing means having an fuel-water inlet from the reservoir and a vapor fuel-water outlet connected to the carburetor, the vaporizing means operatively connected to the engine coolant system, the vaporizing means defining a first fuel-water preheat zone and a second final fuel-water vaporizing zone above the first pre-heat zone, means for maintaining the liquid fuel-water substantially at the upper limit of the final fuel-water vaporizing zone whereby the waste engine heat transferred from the coolant system to the vaporizing means preheats the fuel-water in the first zone to a temperature less than the vaporization temperature of alcohol and heats the fuel-water in the second zone to at least the temperature of water vaporization whereby proper fuel-water vaporization occurs with minimal fractional vaporization.

2. The fuel-water system for an internal combustion steam engine of claim 1 wherein the first and second zones of the vaporizing means comprise, respectively, first and second heat exchanger means, the first and second heat exchanger means operatively interconnected whereby engine coolant from the coolant system is passed, in turn, through the second or vaporizing zone heat exchanger means, then, through the first or preheat zone heat exchanger means whereby engine coolant having the greatest heat energy is available to vaporize fuel-water in the upper vaporizing zone.

3. The fuel-water system for an internal combustion steam engine of claim 2 wherein the vertical dimension of the vaporizing zone second heat exchanger means is substantially less than the vertical dimension of the preheat zone first heat exchanger means whereby final fuel-water vaporization occurs substantially adjacent the upper fuel-water surface within the vaporizing means.

4. A fuel-water system for an internal combustion steam engine adapted for the use of alcohol-water fuel-water mixtures, the engine including at least one cylinder having an air/fuel-water inlet and a burned fuel exhaust outlet, the engine further including a fluid engine coolant system; the fuel-water system comprising a carburetor; a fuel-water reservoir adapted to contain an alcohol-water mixture; two-stage fuel-water vaporizing means having an fuel-water inlet from the reservoir and a vapor fuel-water outlet connected to the carburetor, the vaporizing means operatively connected to the engine coolant system, the vaporizing means defining a first fuel-water preheat zone and a second final fuel-water vaporizing zone above the first pre-heat zone, means for maintaining the liquid fuel-water substantially at the upper limit of the final fuel-water vaporizing zone; means operatively interconnected to the burned fuel exhaust outlet for preheating the combustion air supplied to the engine carburetor whereby the the exhaust and coolant system waste heat energy is recycled to substantially increase the latent heat energy of the alcohol-water mixture admitted to the engine cylinders thereby improving the efficiency of the internal combustion steam engine.

5. The fuel-water system for an internal combustion steam engine of claim 4 including oxygen detector means in the burned fuel exhaust outlet; controllable mixture means adapted to meter the relative proportion of air and fuel-water vapor admitted to the cylinders; control means operatively connected to the oxygen detector means and to the mixture means whereby said relative proportion is automatically adjusted to maintain the burned fuel outlet oxygen content at a predetermined level.

6. A fuel-water system for an internal combustion engine having air intake, cooling and exhaust systems, said fuel-water system comprising:
(a) a fuel reservoir adapted to contain an alcohol-water mixture;
(b) means for vaporizing the fuel-water from said reservoir, said vaporizing means including a first heat exchanger operatively communicating with the cooling system of said internal combustion engine and connecting said reservoir to said air intake system; and
(c) menas for preheating the combustion air supplied to said engine, said preheating means including a second heat exchanger in communication with said air intake system and operatively communicating with said exhaust system comprising a chamber having:
 (i) a partition therein to divide the chamber into a first compartment and a second compartment;
 (ii) an exhaust gas conduit passing through said chamber along said partition having at least one inlet in said first compartment and at least one outlet in said second compartment; and
 (iii) a combustion air inlet in said second compartment and a combustion air outlet in said first compartment
whereby during operation of the engine the waste heat transferred to said cooling system is utilized to vaporize the fuel-water passing though said first heat exchanger, and the waste heat from the exhaust system is directed through the conduit from the first compartment to the second compartment of the chamber to heat the combustion air that flows in the opposite direction through the chamber from the second compartment to the first compartment before passage to said air intake system.

7. The fuel-water system according to claim 6 wherein said first heat exchanger comprises a first container in communication with said fuel-water reservoir and air intake system, the first container having an inlet and an outlet in communication with said engine cooling system, and a second container therein that sealingly engages the inlet and outlet to permit the flow of engine coolant there through whereby said fuel-water flows into said first container and is vaporized by the heat from the engine coolant.

8. The fuel-water system according to claim 7 wherein said first heat exchanger further includes:
   (a) an electric heating element disposed in said first container immersed in said fuel-water; and
   (b) thermostatic control means for operating said heating element when the fuel-water temperature in said first container is below a preset value.

9. The fuel-water system according to claim 7 wherein said first container includes valve means for permitting fuel-water flow from the fuel-water reservoir to the first container when the fuel-water level in the latter is below a specified level.

10. The fuel-water system according to claim 7 wherein said first container includes a relief valve for releasing pressure from witin the first container when the internal pressure exceeds a preset level.

11. The fuel-water system according to claim 6 wherein said first container includes valve means for permitting fuel-water flow from the fuel-water reservoir to the first container when the fuel-water level in the latter is below a specified level.

12. The fuel-water system according to claim 6 wherein said first container includes a relief valve for releasing pressure from within the first container when the internal pressure exceeds a preset level.

13. A fuel-water system for an internal combustion engine having air intake, cooling and exhaust systems, said fuel-water system comprising:
   (a) a fuel-water reservoir adapted to contain an alcohol-water mixture;
   (b) means for vaporizing the fuel-water from said reservoir, said vaporizing means including a first heat exchanger comprising a first container in communication with said fuel-water reservoir and air intake system, and the first container having an inlet and an outlet in communication with said engine cooling system, and a second container therein that sealingly engages the inlet and outlet to permit the flow of engine coolant therethrough whereby said fuel-water flows into said first container and is vaporized by the heat from the engine coolant;
   (c) means for preheating the combustion air supplied to said engine, said preheating means including a second heat exchanger comprising a chamber having a partition therein to divide the chamber into a first compartment and a second compartment, an exhaust gas conduit passing through said chamber along said partition having at least one outlet in said first compartment and at least one outlet in said second compartment, and a combustion air inlet in said second compartment and a combustion air outlet in said first compartment;

whereby during operation of the engine the waste heat transferred to said cooling system is utilized to vaporize the fuel-water passing through said first heat exchanger, and gases from the exhaust system are directed through the conduit from the first compartment to the second compartment of the chamber to heat the combustion air that flows in the opposite direction through the chamber from the second compartment to the first compartment before passageto said air intake system.

14. The fuel-water system according to claim 13 wherein said first heat exchanger further includes:
   (a) an electric heating element disposed in said first container immersed in said fuel-water; and
   (b) thermostatic control means for operating said heating element when the fuel-water temperature in said first container is below a preset value.

\* \* \* \* \*